United States Patent [19]

Lindquist

[11] 4,137,795

[45] Feb. 6, 1979

[54] SAFETY GUARD FOR POWER PRESSES

[76] Inventor: J. Theodore Lindquist, 7654 Tripp Ave., Skokie, Ill. 60076

[21] Appl. No.: 808,830

[22] Filed: Jun. 22, 1977

[51] Int. Cl.$^2$ .......................... F16P 1/00; G05G 25/00
[52] U.S. Cl. ...................................... 74/613; 192/134
[58] Field of Search ................. 74/612, 613, 614, 615; 192/134

[56] References Cited

U.S. PATENT DOCUMENTS

| | | | |
|---|---|---|---|
| 1,178,606 | 4/1916 | Triem | 74/613 |
| 1,204,473 | 11/1916 | Moore | 74/615 |
| 1,289,536 | 12/1918 | Pinkerton | 74/613 |
| 1,408,020 | 2/1922 | Martha | 74/613 |
| 1,532,546 | 4/1925 | Pope | 74/615 |
| 1,821,651 | 9/1931 | Kunkel | 74/613 |
| 1,958,128 | 5/1934 | Cate | 74/613 |
| 2,501,347 | 3/1950 | Murcko | 74/615 |
| 2,683,515 | 7/1954 | Horn et al. | 74/615 X |
| 3,063,320 | 11/1962 | Beagley | 74/612 X |
| 3,186,256 | 6/1965 | Reznick | 74/615 |
| 3,213,992 | 10/1965 | Gastafson et al. | 192/134 |
| 3,269,215 | 8/1966 | Linquist | 74/612 |
| 3,464,291 | 9/1969 | Linquist et al. | 192/134 X |
| 3,522,868 | 8/1970 | Gerger | 74/615 X |
| 3,913,413 | 10/1975 | Walker | 74/612 |
| 3,988,980 | 11/1976 | Walker | 74/612 |
| 4,033,250 | 7/1977 | Pinkstaff | 74/615 |
| 4,060,160 | 11/1977 | Lieber | 192/134 |

FOREIGN PATENT DOCUMENTS

| | | | |
|---|---|---|---|
| 146991 | 12/1903 | Fed. Rep. of Germany | 74/615 |
| 2516533 | 10/1976 | Fed. Rep. of Germany | 74/612 |
| 1203851 | 1/1960 | France | 192/134 |
| 12296 of | 1912 | United Kingdom | 74/615 |
| 637651 | 5/1950 | United Kingdom | 74/612 |
| 1433903 | 4/1976 | United Kingdom | 74/613 |

*Primary Examiner*—Leslie Braun

[57] ABSTRACT

A safety guard apparatus for a power press prevents the ram of the press from descending until the safety guard is in position to protect the operator. On presses which are equipped with part revolution clutches, the safety guard apparatus causes the ram to stop if the safety guard sensor is raised during operation. The safety guard is reciprocably mounted in a frame attached to the power press, and a sensing member is movably mounted on the safety guard. The bottom edge of the sensing member extends below the safety guard, and upward movement of the sensing member moves a switch-contacting rod out of engagement with a normally closed switch which is held open by the rod. The safety guard is raised and lowered by a power cylinder, and when the sensing member is raised and the normally closed switch closes, the power cylinder raises the safety guard. The normally closed switch on the reciprocating safety guard is electrically connected to wires on the frame by bus rods which are mounted on the safety guard and which slide through contact members on the guard frame. If the sensing member does not engage anything as the safety guard moves downwardly, an abutment on the bus rods engages and closes a normally open switch on the guard frame, and power is supplied to the ram to lower the ram. Power is transmitted to the ram by a clutch which is operated, for example, by a foot pedal or hand buttons. A control apparatus for the clutch prevents movement of the ram until the normally open switch on the guard frame is closed by the safety guard, and the control apparatus stops the ram if the sensing member is raised to permit the held-open normally closed switch to close. Premature closing of the normally open switch on the guard frame results in total lockout of the system. A reset button must be depressed before power to the system can be restored.

14 Claims, 5 Drawing Figures

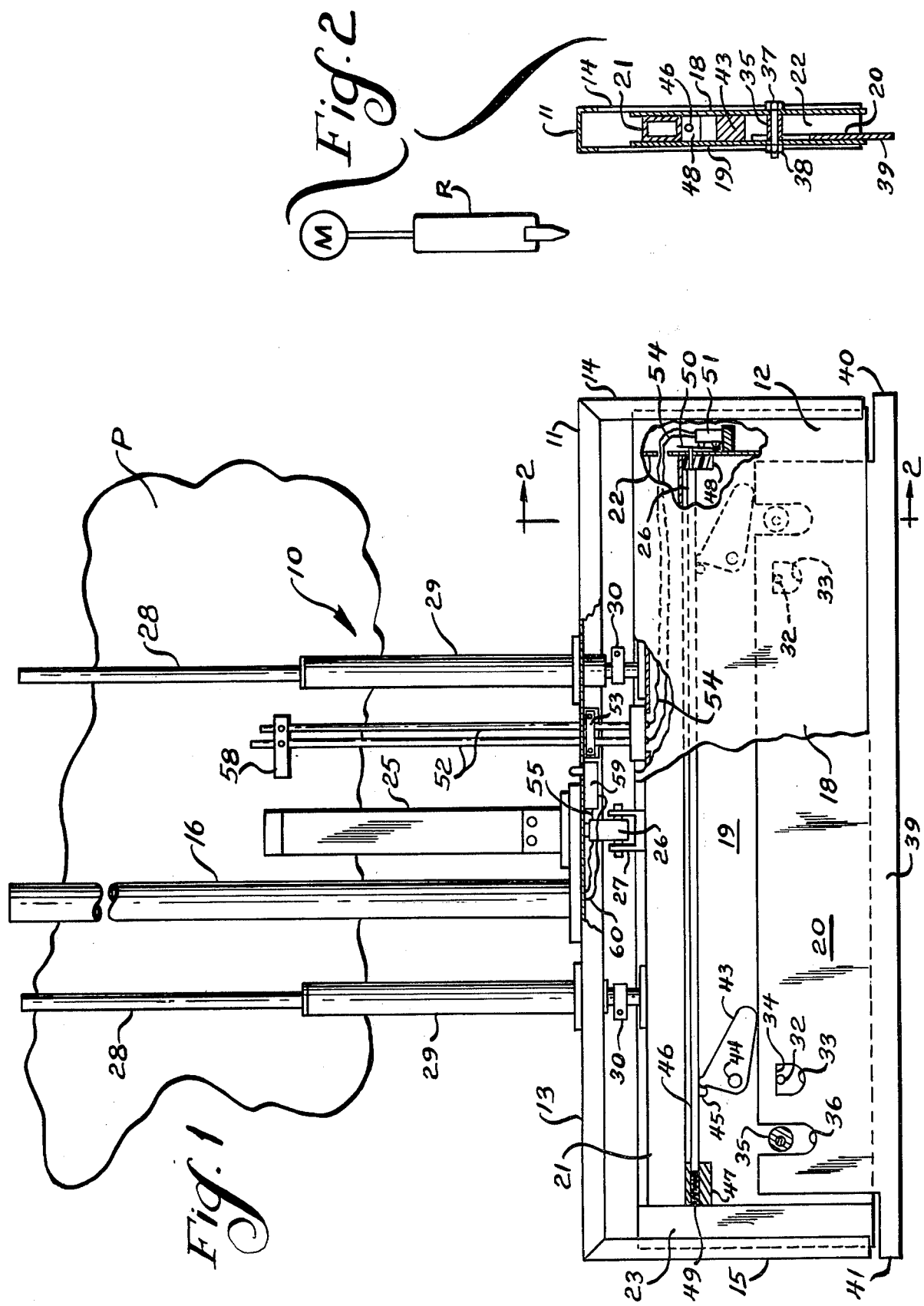

SAFETY GUARD FOR POWER PRESSES

BACKGROUND AND SUMMARY

This invention relates to a safety guard for power presses, such as press brakes, punch presses, shears, and the like.

A power press is conventionally equipped with a safety mechanism for protecting the operator as the ram or power member of the press descends toward the work material. Examples of such safety mechanisms are described in my prior U.S. Pat. Nos. 3,213,992; 3,269,215; and 3,464,291.

The invention relates to an improved safety mechanism which provides reliable, safe operation. The safety guard or shield reciprocates within a frame mounted on the power press, and the ram of the power press cannot be activated until the safety guard reaches its lowermost position. A lightweight sensory board is mounted on the safety guard for sensitive detection of any object in the path of the descending safety guard, and if the sensory board engages an object, such as the operator's fingers, the sensory board will be raised relative to the safety guard to close a switch and cause the safety guard to be raised to the up or safety position. The normally closed switch operated by the sensory board is mounted on the reciprocating safety guard, and an electrical connection between the switch and the frame is made through bus rods which are mounted on the safety guard and are slidably engaged with a contact member on the frame. The safety guard is operatively connected to a control member which couples the foot pedal or other operating member of the power press and the clutch for the ram. When the foot pedal is depressed, the control member activates a power cylinder for the safety guard to lower the safety guard and prevents the clutch from transmitting power to the ram until the safety guard reaches its lowermost position. When the safety guard reaches its lowermost position, it closes a switch to cause the control member to couple the foot pedal and the clutch, and the foot pedal can then be further depressed to lower the ram. If the press is equipped with a full revolution clutch, the safety guard remains down throughout the full cycle of the ram. If the press is equipped with a part revolution clutch, the safety guard returns to its up position when the ram cycle passes 180° of its stroke and the ram rises. On the latter type of press, if the sensory board is raised to cause the held-open normally closed switch on the safety guard to close when the ram is descending, the control member uncouples the clutch, and the ram stops.

DESCRIPTION OF THE DRAWING

FIG. 1 is an elevational view, partially broken away, of a safety guard apparatus for a power press formed in accordance with the invention;

FIG. 2 is a sectional view taken along the line 2—2 of FIG. 1;

DESCRIPTION OF THE SPECIFIC EMBODIMENT

Figure 3:
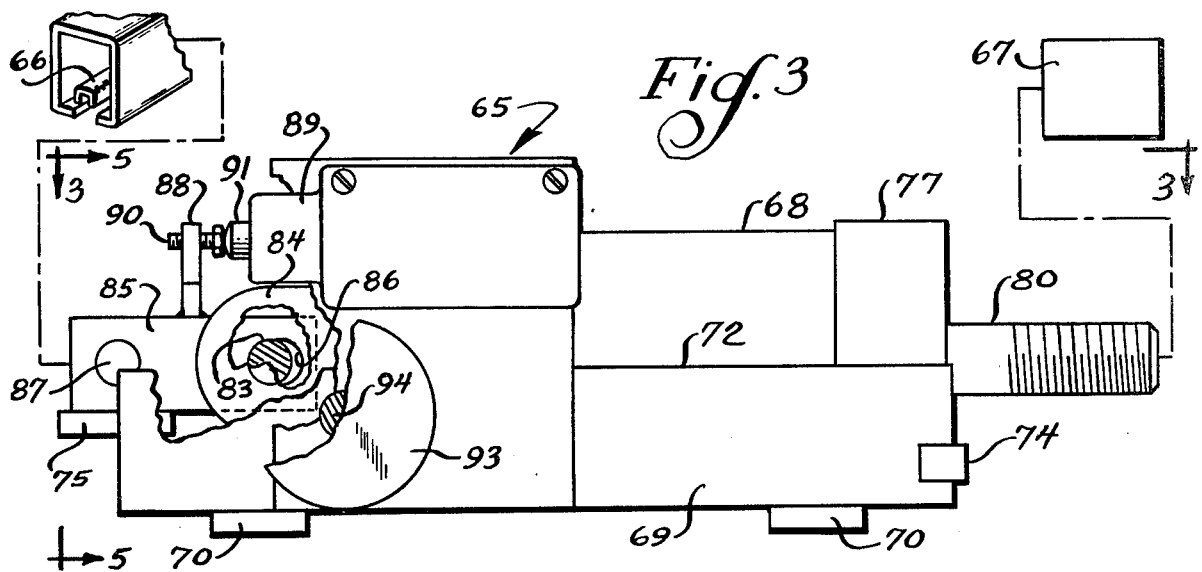
FIG. 3 is a side elevational view of a clutch control apparatus.

Referring to FIG. 1, the numeral 10 designates generally a safety guard apparatus intended for use with a power press P such as a press brake, a shear, a punch press, etc. Such power presses are well known and do not form any part of the present invention so they need not be described herein. Examples of power presses with which the invention can be used are described in my U.S. Pat. Nos. 3,213,992; 3,269,215; and 3,464,291.

The safety guard apparatus includes a C-shaped frame 11 and a shield or safety guard 12 which is reciprocably mounted on the frame. The frame includes three channel-shaped members — a top horizontally extending channel 13 and right and left downwardly extending channels 14 and 15. The top channel is attached to and supported by a tubular support pipe 16, and the support pipe is attached to the front of the power press so that the safety guard will be in position to protect the operator from the reciprocable ram or metal-forming member of the press.

The safety guard 12 reciprocates vertically within the side walls of the downwardly extending side channels 14 and 15 of the frame. The safety guard includes front and back plates 18 and 19 (see also FIG. 2), and the left half of the front plate is broken away in FIG. 1 to reveal a sensing member which comprises a flat board or plate 20 movably mounted between the spaced-apart front and back plates. The front and back plates are attached to an upper horizontally extending rectangular tube 21 and a pair of downwardly extending rectangular tubes 22 and 23 which slide within the frame channels 14 and 15, respectively.

The safety guard is reciprocable with respect to the frame by a power cylinder 25 mounted on the upper channel 13 and a piston 26 which extends through an opening in the upper channel and is connected to a bracket 27 on the tube 21. The vertical reciprocation of the safety guard is guided by a pair of guide rods 28 which extend upwardly from the upper tube 21 and reciprocate within guide housings 29 on the frame. A stop member 30 is attached to the lower end of each guide rod to limit the upward movement of the safety guard. The stop members are adjustable along the length of the guide rods to vary the stroke of the safety guard as desired.

The sensory board 20 is supported by a pair of pins 32 which extend between the front and back plates 18 and 19 of the safety guard through openings 33 in the sensory board. Each opening is provided with a flat upper edge 34 which engages the pin. The sensory board is guided for vertical reciprocation between the front and back plates by spacer sleeves 35 which are positioned in U-shaped notches 36 in the sensory board. Each spacer sleeve is supported by a bolt 37 (FIG. 2) which extends through the front and back plates and which is engaged with a nut 38. The lower edge portion 39 of the sensory board projects downwardly beyond the lower edge of the safety guard and includes a pair of laterally extending end portions 40 and 41 which enable the sensory board to extend for the full length of the safety guard.

The upper edge of the sensory board engages a pair of cams 43, each of which is pivotally mounted between the front and back plates of the safety guard by a pin 44. The upper edge of each cam engages a downwardly projecting lug 45 on a horizontally extending rod 46 which extends below the upper tube 21 of the safety guard. The left end of the rod 36 is slidably supported by a nylon block 47 which is mounted between the front and back plates, and the right end of the rod is slidably supported by a nylon block 48. The rod 46 is resiliently biased to the right by a coil spring 49 which engages the left end of the rod, and the right end of the rod extends through the block 48 and the right tube 22 to engage and hold open a switch blade 50 of a normally closed switch 51. The portion of the right end of the rod which extends through the block has a reduced diameter to provide a radially enlarged stop shoulder which abuts the block to prevent the rod from moving too far to the right.

From the foregoing it will be understood that upward movement of the sensory board relative to the safety guard will rotate the cam 43 counterclockwise and move the rod 46 to the left out of engagement with the normally closed switch 51 to allow the switch to close.

The switch 51 is carried by the safety guard as the safety guard reciprocates within the frame 11. The switch is electrically connected to the electrical circuit of the power press through two metal bus rods 52 which are mounted on the upper tube 21 of the safety guard. The bus rods extend slidably through a contact member 53 which is mounted on the frame and which includes an electrical contact for each of the bus rods which electrically engages the bus rod as the bus rod reciprocates with the safety guard. If desired, the contacts can comprise spring-biased metal or brush wire contacts which wipe against the bus rods as the bus rods reciprocate. The switch 51 is connected to the bus rods by a pair of wires 54, and the two contacts of the contact member 53 are connected to the electrical circuit of the power press by a pair of wires 55 which extend through the support pipe 16. Alternatively, a single bus rod can be divided into insulated conducting segments or provided with separate conducting strips which engage separate contacts on the frame. The bus rods permit the switch 51 to be connected to the electrical circuit of the press without having wires extend between the frame and the reciprocating safety guard.

An abutment 58 is carried by the upper end of the bus rod and is engageable with a normally open switch 59 on the frame 11 when the safety guard reaches its lowermost position to close the normally open switch. The wires 60 for connecting the switch 59 to the electrical circuit of the power press also extend through the support pipe 16.

Electrical circuits for power presses are well known and need not be explained herein. Such a circuit conventionally includes a means for signalling the power member for the safety guard to descend to its protective position in front of the ram R (FIG. 2) of the power press and means for preventing downward movement of the ram until the safety guard reaches its lowermost position. At that time a signal from the safety guard provides power to the ram to lower the ram. If the safety guard fails to reach its lowermost position, the ram remains inoperative.

Some power presses are equipped with a full revolution clutch and some presses are equipped with a part revolution clutch, both of which are well known in the art. In each case the structure of the safety guard is the same. However, the electrical circuits may vary. On a press equipped with a full revolution clutch, the safety guard is maintained by the cylinder 25 in its lowermost, guarding position throughout the full cycle of the press ram. On a press equipped with a part revolution clutch, the safety guard is raised by the cylinder 25 when the ram cycle passes 180° of its stroke and the ram rises. However, if the safety guard is raised prematurely while the ram is descending, the safety guard activates a signal through the electrical circuit which stops further descent of the ram.

The cooperation between such an electrical circuit and the safety guard described herein is apparent from the foregoing description. At the beginning of a cycle, the power cylinder 25 (which can be a hydraulic or pneumatic cylinder) is activated to lower the safety guard. The power means M for lowering the ram cannot be activated while the normally open switch 59 remains open, and the switch 59 will remain open until the safety guard reaches its lowermost position and the abutment 58 engages and closes the switch. If the normally open switch 59 is closed for any reason before the safety guard reaches its lowermost position, this will result in a total lock out of the electrical system, and a reset button must be depressed before power to the system can be restored.

If the sensory board contacts an object as the safety guard descends, the sensory board is raised relative to the safety switch 51 to allow the switch to close. When the switch 51 closes, the power cylinder 25 reverses and raises the safety guard to its original position. If the power press has a part revolution clutch and the sensory board is raised after the safety guard reaches its lowermost position to activate the power means for the ram, the closing of the switch 51 deactivates the ram power means and the ram stops.

The sensory board is made of lightweight material and can be raised relative to the safety guard to close the normally closed switch 50 by a very small force. The sensory board therefore provides a very sensitive safety stop which will stop downward movement of the safety guard before excessive force is exerted against the object which the sensory board engages, e.g., the operator's hands. If the means for stopping downward movement of the safety guard were activated by engagement of the heavier safety guard with the operator's hands rather than the lightweight sensory board, the safety guard could damage the hands before it was stopped.

Figure 4:
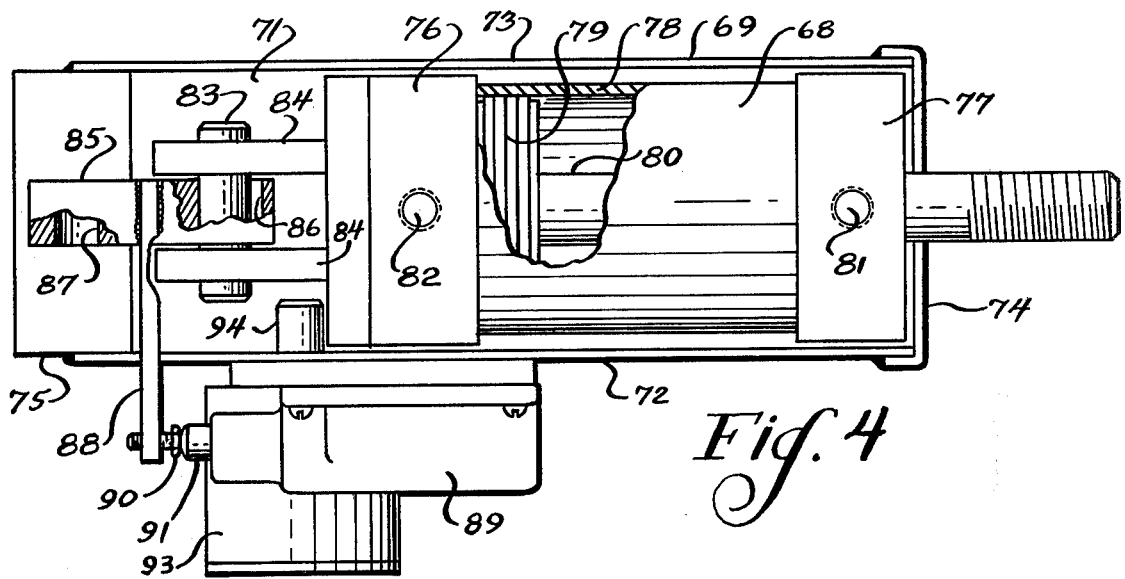
FIG. 4 is a plan view of the clutch control apparatus taken along the line 3—3 of FIG. 3.
Figure 5:
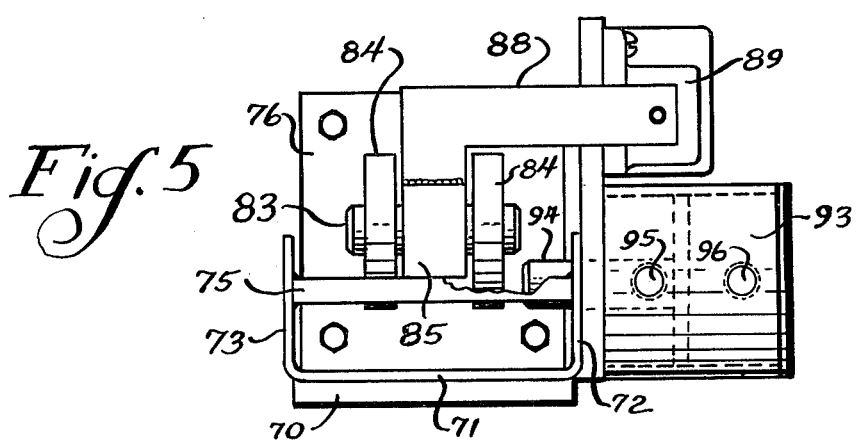
FIG. 5 is an end view of the clutch control apparatus taken along the line 5—5 of FIG. 3.

FIGS. 3–5 illustrate a particular control apparatus for use with my safety guard. The control apparatus 65 is adapted to be mounted on the power press and cooperates with the safety guard to couple the foot pedal 66 for operating the power press and the clutch 67 for transmitting power from the ram power means M (FIG. 2) to the ram.

The control apparatus includes a slide member 68 which is slidably supported by a housing 69 which is attached to the power press by mounting pads 70. The housing includes a bottom wall 71 and a pair of upwardly extending side walls 72 and 73, a rear limit stop and connecting bar 74 which extends between the side walls, and a front plate 75 which extends between the side walls.

The slide member includes front and rear rectangular end blocks 76 and 77 and a cylindrical wall 78 which extends between the end blocks. A piston 79 is reciprocable within the cylinder 78, and a connecting rod 80 extends through the rear end block 77 for attachment to the clutch. The rear end block 77 is provided with a port 81 for filling the cylinder behind the rod end of the piston with pressurized fluid, e.g., air, and the front end block 76 is provided with a port 82 for exhausting air when the cylinder is pressurized through port 81 and the piston moves forwardly.

A pin 83 is supported by a pair of forwardly projecting lugs 84 which are attached to the front end block 76. A link 85 is slidably supported by the front plate 75 and is provided with an oval opening 86 through which the pin 83 extends and an opening 87 for connecting the link to the foot pedal. An L-shaped contact arm 88 is mounted on the link and extends over the side wall 72 of the housing adjacent a normally closed switch 89 which is mounted on the housing. An adjusting screw 90 on the end of the contact arm is engageable with the push button 91 of the switch to open the switch when the contact arm is in its FIG. 4 position.

A double-acting cylinder 93 is mounted on the side wall 72 of the housing, and a stop pin 94 carried by a piston within the cylinder 93 extends through the side wall in front of the front end block 76. The pin prevents the front end block from moving forwardly when the pin is in the position shown in FIG. 4. The cylinder is provided with ports 95 and 96 (FIG. 5) for supplying the cylinder with pressurized fluid for retracting the pin from its FIG. 4 position to permit the front end block and the slide member to move to the left as viewed in FIG. 4.

The fluid supply means for the cylinders 78 and 93 are connected by the electrical circuit of the power press to the normally opened switch 59 which is closed when the safety guard reaches its lowermost position. Until that time, the stop pin 94 is locked by fluid pressure in the FIG. 4 position, and the cylinder 78 is not pressurized.

The normally closed switch 89 on the control member is connected by the electrical circuit to the fluid supply means for the power cylinder 25 for the safety guard. When the foot pedal 66 is depressed, the link 85 is pulled to the left as viewed in FIGS. 3 and 4, and the switch 89 closes to activate the power cylinder 25. The link 85 is permitted to move to the left sufficiently to permit the switch 89 to close by the oval opening 86 in the link, which has a long dimension which is slightly greater than the diameter of the pin 83. When the contact arm 88 moves away from the switch 89, the switch closes and the power cylinder 25 is activated to lower the safety guard.

The stop pin 94 engages the front end block 76 and prevents the slide member 68 from moving when the foot pedal is depressed. However, when the safety guard reaches its lowermost position and the abutment 58 closes the switch 59, the fluid supply means for the cylinders 78 and 93 are activated to force pressurized fluid through port 81 for the cylinder 78 and port 95 of cylinder 93. The pressurized fluid within the cylinder 78 forces piston 79 against the front end block 76 and couples the piston and the end block together so that the piston will move to the left as the end block and cylinder move to the left. The pressurized fluid entering cylinder 93 through port 95 forces the piston which carries the stop pin 94 to the right as viewed in FIG. 5 and frees the slide member 68 for forward movement under the urging of the foot pedal. As the front end block and piston move forwardly, the piston rod 80 activates the clutch and causes the clutch to transmit power to the clutch to lower the ram.

If the sensory board is raised when the ram is descending, the held-open normally closed switch 51 will close, and this will activate the fluid supply means for the cylinder 78 to relieve the pressure on the piston 79. When the piston is no longer forced against the front end block by the fluid pressure, the piston can slide to the right within the cylinder 78 to permit the spring-biased clutch to return to its neutral position. Power to the ram is thereby shut off, and the ram stops. Alternatively, the cylinder 78 can be double acting, and the fluid supply means for the cylinder 78 can force pressurized fluid through the port 82 to force the piston to move to the right to return the clutch to a neutral position.

While in the foregoing specification a detailed description of a specific embodiment of the invention was set forth for the purpose of illustration, it is to be understood that many of the details hereingiven may be varied considerably by those skilled in the art without departing from the spirit and scope of the invention.

I claim:

1. In a power press having a ram movable between first and second positions, power means for moving the ram, clutch means for transmitting power from the power means to the ram, and a foot pedal for operating the ram, a safety guard and control assembly comprising:
   a) a safety guard frame mounted on the power press,
   b) a safety guard reciprocably mounted on the frame for generally vertical movement between an unactuated position and an actuated position,
   c) a sensory member movably mounted on the safety guard and having an edge portion extending below the safety guard, the sensory member being movable upwardly relative to the safety guard between a rest position and a second position when the edge portion of the sensory member engages an object as the safety guard moves from its unactuated position toward its actuated position,
   d) means for reciprocating the safety guard,
   e) first switch means on the safety guard movable between a first position and a second position,
   f) first switch-activating means between the sensory member and the first switch means for moving the first switch means to its second position when the sensory member moves to its second position,
   g) control means for operating the power means for moving the ram and the means for reciprocating the safety guard, the control means including:
      i) a first slide member movably mounted on the power press and slidable between first, second, and third positions, the first slide member being connected to the foot pedal for movement therewith,
      ii) second switch means movable between a first position and a second position in response to movement of the slide member from its first position to its second position for energizing the means for reciprocating the safety guard,
      iii) stop means for preventing movement of the first slide member from its second position to its third position, the stop means being movable in response to a signal caused by the safety guard reaching its actuated position to permit movement of the first slide member from its second position to its third poistion,
      iv) a second slide member slidably mounted on the power press and connected to the clutch means, the second slide member being movable between a first position in which the clutch means does not transmit power to the ram and a second position in which the clutch means transmits power to the ram, v) means for coupling the first and second slide members for simultaneous sliding movement in response to a signal caused by the safety guard reaching its actuated position, the second slide member being movable to its second position by the first slide member as the first slide member moves to its third position when the first and second slide members are coupled, h) third switch means on the frame movable between a first position and a second position for signalling the stop means to move to permit movement of the first slide member from its second to its third position and for signalling the coupling means to couple the first and second slide member for simultaneous sliding movement, and i) switch-activating means on the safety guard for moving the third switch means to its second position when the safety guard reaches its actuated position.

2. The structure of claim 1 in which the first switch means signals the coupling means to uncouple the first and second slide members when the first switch-activating means moves the first switch means to its second position whereby the second slide member moves to its first position and the clutch means does not transmit power to the ram.

3. The structure of claim 1 in which the coupling means includes a cylinder attached to the first slide member, the second slide member comprising a piston slidable within the cylinder, and fluid supply means for pressurizing the cylinder and for forcing the piston against the first slide member so that the piston moves with the first slide member.

4. The structure of claim 1 in which the stop means includes a cylinder, a piston movable within the cylinder between first and second positions, a pin connected to the piston for engaging the first slide member when the piston is in its first position whereby the first slide member is prevented from moving from its second to its third position, and fluid supply means for pressurizing the cylinder and for moving the piston from its first position to its second position.

5. A safety guard apparatus for a power press comprising:
a frame adapted to be mounted on the power press,
a safety guard reciprocably mounted on the frame for generally vertical movement between an unactuated position and an actuated position,
a sensing member movably mounted on the safety guard and having an edge portion extending below the safety guard, the sensing member being movable upwardly relative to the safety guard between a rest position and a second position when the edge portion of the sensing member engages an object as the safety guard moves from its unactuated position toward its actuated position,
power means for reciprocating the safety guard,
switch means on the safety guard movable between a first position and a second position for preventing the power means from moving the safety guard toward the actuated position, and
switch activating means between the sensing member and the switch means for moving the switch means to its second position when the sensing member moves to its second position.

6. The apparatus of claim 5 including a electrically conductive rod mounted on the safety guard and electrically connected to the switch means, and an electrically conductive contact member mounted on the frame and slidably engaging the rod whereby the switch means is electrically connected to the contact member as the safety guard reciprocates.

7. The apparatus of claim 5 in which the switch-activating means includes a rod slidably mounted on the safety guard and engageable with the switch means, the rod being movable from a first position to a second position for moving the switch means to its second position, and cam means on the safety guard engageable with the sensing member and the rod for moving the rod to its second position when the sensing member moves to its second position.

8. The apparatus of claim 7 in which the switch means comprises a normally opened electrical switch, the rod engaging the switch when the rod is in its first position to maintain the switch closed.

9. The apparatus of claim 5 in which the safety guard includes a pair of spaced parallel plates and the sensing member comprises a third plate interposed between the two spaced plates, the sensing member being supported by pins which extend between the two spaced plates through openings in the sensing member, the vertical dimension of the openings being greater than the thickness of the pins whereby the sensing member can move upwardly with respect to the pin.

10. The apparatus of claim 5 including a second switch means on the frame movable between a first position and a second position for moving a ram on the power press, and second switch-activating means on the safety guard for moving the second switch means to its second position when the safety guard reaches its activated position.

11. The apparatus of claim 10 in which the second switch means is a normally opened electrical switch, the second switch-activating means engaging the normally opened switch when the safety guard reaches its actuated position to move the switch to a closed position.

12. The apparatus of claim 11 in which the second switch-activating means includes a rod extending slidably through the frame and an abutment on the rod engageable with the second normally opened switch when the safety guard reaches its actuated position.

13. The apparatus of claim 10 including a pair of vertically extending guide housings mounted on the frame and a pair of vertically extending guide rods mounted on the safety guard and reciprocable within the guide housings, the power means for reciprocating the safety guard comprising a cylinder mounted on the frame and a piston reciprocable within the cylinder and connected to the safety guard.

14. The apparatus of claim 13 including an electrically conductive rod mounted on the safety guard and electrically connected to the first switch means, and an electrically conductive contact member mounted on the frame and slidably engaging the rod whereby the first switch means is electrically connected to the contact member as the safety guard reciprocates.

* * * * *